United States Patent
Hwang et al.

[19]

[11] Patent Number: 6,098,023
[45] Date of Patent: Aug. 1, 2000

[54] DRIVING CONTROL SYSTEM AND MONITORING DEVICE FOR FAN FILTER UNIT IN SEMICONDUCTOR CLEAN ROOM

[75] Inventors: Jung-sung Hwang; Jae-heung Choi, both of Yongin; Yo-han Ahn, Seoul; Dong-joo Lee, Yongin, all of Rep. of Korea

[73] Assignee: Samsung Electronics, Co., Ltd., Suwon, Rep. of Korea

[21] Appl. No.: 08/959,858

[22] Filed: Oct. 29, 1997

[30] Foreign Application Priority Data

Nov. 6, 1996 [KR] Rep. of Korea ............ 96-52412

[51] Int. Cl.[7] ............ G06F 11/30; G05B 11/00; F24F 7/06

[52] U.S. Cl. ............ 702/45; 702/84; 700/12; 700/108; 454/140; 454/187

[58] Field of Search ............ 702/45, 84, 185, 702/41, 44; 700/20, 19, 12, 117, 13, 108; 454/187, 202, 139–140

[56] References Cited

U.S. PATENT DOCUMENTS

| | | | |
|---|---|---|---|
| 5,096,477 | 3/1992 | Shinoda et al. | 454/187 |
| 5,626,820 | 5/1997 | Kinkead et al. | 454/187 |
| 5,664,995 | 9/1997 | O'Keefe | 454/187 |
| 5,810,657 | 9/1998 | Pariseau | 454/61 |
| 5,828,572 | 10/1998 | Hasegawa et al. | 700/20 |

*Primary Examiner*—Marc S. Hoff
*Assistant Examiner*—Bryan Bui
*Attorney, Agent, or Firm*—Jones Volentine, LLP

[57] ABSTRACT

A monitoring device and a driving control system for a fan filter unit in a semiconductor clean room for monitoring the operating state of the fan filter unit. The monitoring device includes a switching section in each fan filter unit which alternately applies electrical power to one of a plurality of terminals. The switching section is responsive to a force from an air stream introduced therein via rotation of a fan in the fan filter unit. A display section in each fan filter unit is connected to the plurality of terminals which provide different signals, indicative of an on or off state of the fan, according to which of the plurality of terminals is electrically connected to the electrical power.

20 Claims, 4 Drawing Sheets

DRIVING CONTROL SYSTEM AND MONITORING DEVICE FOR FAN FILTER UNIT IN SEMICONDUCTOR CLEAN ROOM

BACKGROUND OF THE INVENTION

1. Field of the Invention

This invention relates to a driving control system and monitoring device for the fan filter unit in a semiconductor clean room. More particularly, it relates to a monitoring device that effectively indicates and signals the normal or abnormal operating state of the driving control system for the fan unit.

2. Description of the Related Art

It is known that the production quality and yield of semiconductor devices are greatly affected by the ambient conditions under which they are produced. Accordingly, the semiconductor device manufacturing process is performed in highly-purified clean rooms in which an air stream is continually introduced into the clean room to discharge particles and other impurities. Preferably, the introduced air would flow downward within the clean room, and swirling or parallel air streams should be prevented as best possible.

FIG. 1 is a simplified schematic diagram of a clean room in which the manufacturing equipment is installed along a production line 1. A plurality of fan filter units 3 are provided in the ceiling of the clean room, and a grating 4 is installed on the bottom of the clean room. As shown in FIG. 1, the air introduced into the clean room is filtered through the fan filter unit 3 and flows downward through the clean room and into the grating 4 below. This downward flowing air stream removes the impurities from the production line 1 through the grating 4. Cleanliness in the clean room is maintained, and the recirculated air from the grating 4 is filtered in the fan filter unit 3 to begin another cycle.

FIG. 2 is an enlarged cross-sectional view of the conventional fan filter unit 3 that includes a fan 11, a driving motor 12, which is controlled by its own local control unit 14 with a micro processor provided therein, and a filter 13 for removing impurities mixed with the recirculated air from the clean room. Since the fan filter unit 3 is crucial for maintaining the cleanness of the clean room, the operating state of each of the components of the fan filter units is monitored and controlled by a main computer connected to the components via a computer network.

FIG. 3 is a block diagram illustrating the conventional driving control system of the fan filter unit, wherein a plurality of fan filter units (FFU) 3 are divided into groups depending on their locations or installation lines, and a corresponding plurality of multi-control units (MCU) 15 controls each respective group of FFU's. The multi-control units 15 are integrated into a single host control unit (HCU) 17 through a plurality of relay control units (RCU) 16 corresponding to each group of FFUs. A monitor 18 connected to the host control unit 17 monitors the operating state of all of the fan filter units 3.

The driving control monitoring system of the fan filter unit as mentioned above senses the abnormal operating state of the fan filter unit 3 by the current or voltage flowing through the network connecting each fan filter unit 3 and its local control unit (LCU) 14. However, in some cases, even when the fan filter unit 3 is operating abnormally, the current may continue to flow to the fan filter unit 3. Therefore, the host control unit 17 does not detect the abnormal state of the fan filter unit 3.

The conventional driving control system monitoring function for the fan filter unit 3 thus suffers some drawbacks in that it is not capable of precisely monitoring its operating state, nor can it detect the source for the processing defects.

When the fan filter unit 3 stops operating, the downward air stream is not generated such that the clean room cannot maintain its high standard of cleanness, whereby the production yield decreases due to the contamination of the processing line.

SUMMARY OF THE INVENTION

The present invention is directed to a driving control system and monitoring device for a fan filter unit for a semiconductor clean room, which substantially overcomes one or more of the problems due to limitations and disadvantages of the related art.

An object of the present invention is to provide a driving control system and monitoring device for the fan filter unit of the semiconductor clean room which can precisely monitor the operating state of the fan unit so as to maintain the cleanliness of the clean room to ensure high production yields.

To achieve this and other advantages, and in accordance with the purpose of the present invention, as embodied and broadly described, there is provided a monitoring device for a fan filter unit having a fan, a driving motor, and a filter in a semiconductor clean room, the monitoring device comprising: a switching section which alternately applies electrical power to one of a plurality of terminals, the switching section being responsive to an air stream introduced therein via rotation of the fan; and a display section connected to the plurality of terminals which provide different signals, indicative of an on or off state of the fan, according to which of the plurality of terminals is electrically connected to the electrical power.

The switching section includes a case equipped with an air inlet for introducing the air stream into the case, with a power terminal installed on one side of the case and the plurality of terminals being installed on an opposite side of the case. A pivoting body is centrally installed between the power supply terminal and the plurality of terminals.

The pivoting body pivots around a longitudinal axis in response to a force exerted by the air stream introduced into the case. The pivoting body is a flat conductive plate having first and second wings centered on the longitudinal axis, with the second wing being positioned below the air inlet. An edge of the first wing electrically communicates with the power terminal and an edge of the second wing alternately communicates electrically with one of the plurality of terminals. Also the weight of the first wing is greater than the second wing.

Accordingly, the pivoting body pivots around the longitudinal axis in a clockwise direction in response to the force exerted by the air stream on the second wing positioned below the air inlet, such that the edge of the second wing contacts the second light connection terminal. On the other hand, the pivoting body pivots around the longitudinal axis in a counter-clockwise direction when the air stream is cut off due to the greater weight of the first wing, such that the edge of the second wing contacts the first light connection terminal.

The display section includes a plurality of lights, one of the lights communicating with the second light connection terminal to provide a visual signal indicative of normal fan unit operations, and the other of the lights communicating with the first light connection terminal to provide a visual signal indicative of abnormal fan unit operations.

In another aspect the invention provides for a driving control system for a fan filter unit in semiconductor clean room having a plurality of fan filter units on its ceiling, the plurality of fan filter units being divided into groups of fan filter units, the driving control system comprising: a switching section in each fan filter unit which alternately applies electrical power to one of a plurality of terminals, the switching section being responsive to an air stream introduced therein via rotation of a fan in the fan filter unit; a display section in each fan filter unit connected to the plurality of terminals which provide different signals, indicative of an on or off state of the fan, according to which of the plurality of terminals is electrically connected to the electrical power; a group multi-control unit monitoring each display section in each fan filter unit in the groups of fan filter units; a group relay control unit monitoring the group multi-control unit; and a host control unit centrally monitoring each group relay control unit, wherein the central monitoring includes monitoring the on or off state of each fan of the fan control units.

It is to be understood that both the foregoing general description and the following detailed description are exemplary and explanatory and are intended to provide further explanation of the invention as claimed.

BRIEF DESCRIPTION OF THE DRAWINGS

The accompanying drawings illustrate embodiments of the invention, in which.

DETAILED DESCRIPTION OF THE PREFERRED EMBODIMENTS

The present invention now will be described with reference to the accompanying drawings in which preferred embodiments of the invention are shown. This invention may, however, be embodied in many deferent forms and should not be construed as limited to the embodiments set forth herein; rather, these embodiments are provided so that this disclosure will be thorough and complete, and will fully convey the scope of the invention to those skilled in the art.

Figure 1:
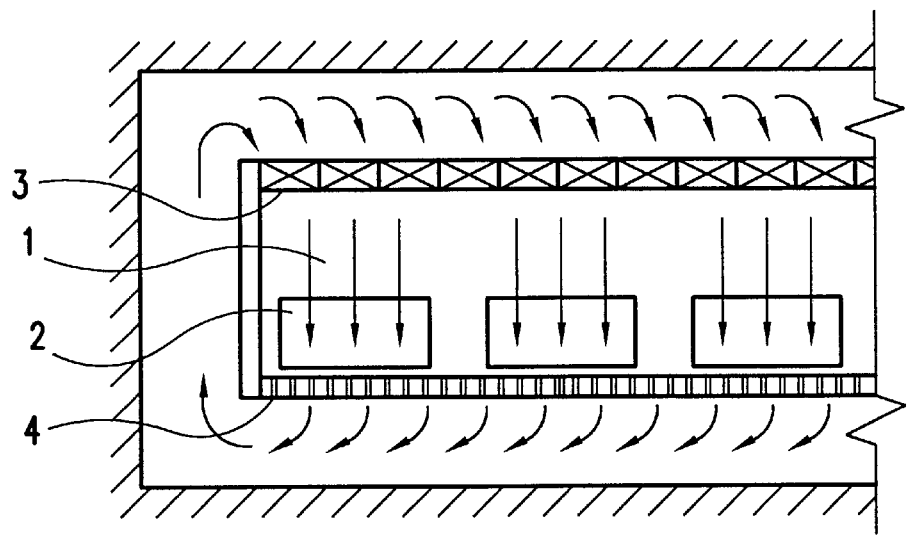
FIG. 1 is a schematic representation showing an air flow path inside a conventional clean room.
Figure 2:
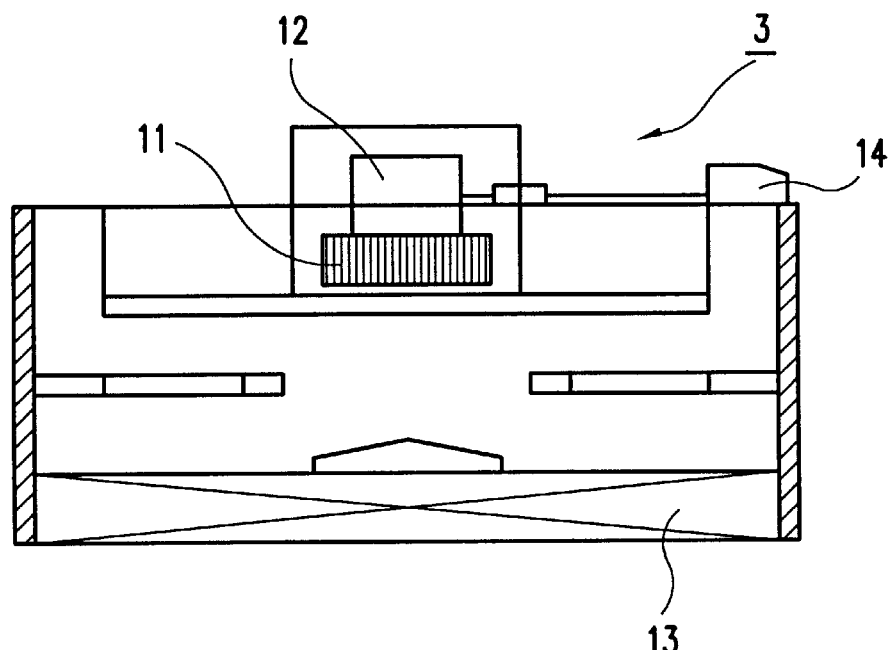
FIG. 2 is a cross-sectional view of a conventional fan filter unit.
Figure 3:
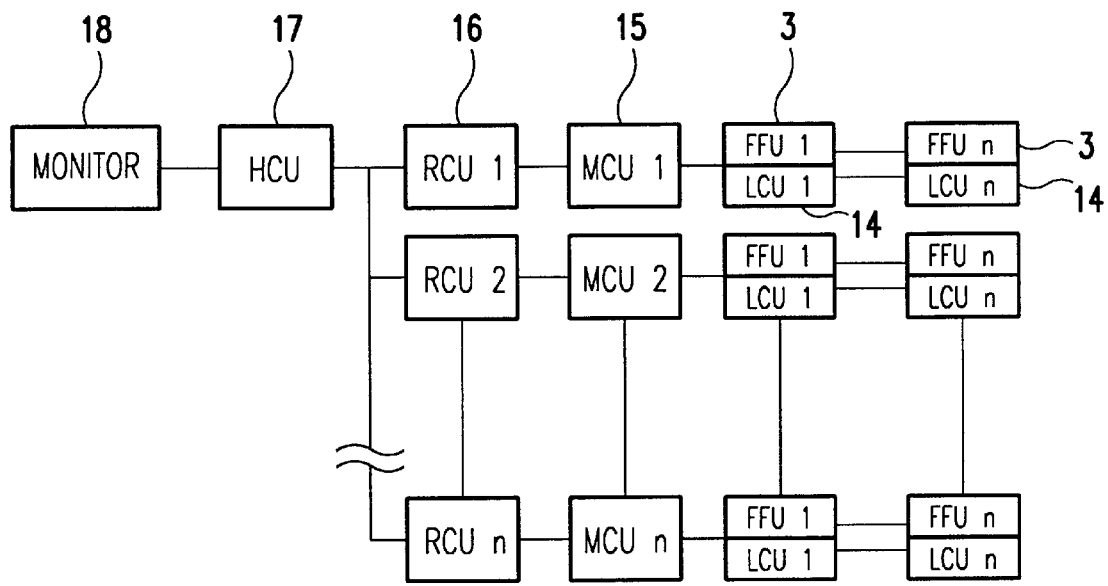
FIG. 3 is a block diagram illustrating the conventional driving control system of the fan filter unit.
Figure 4:
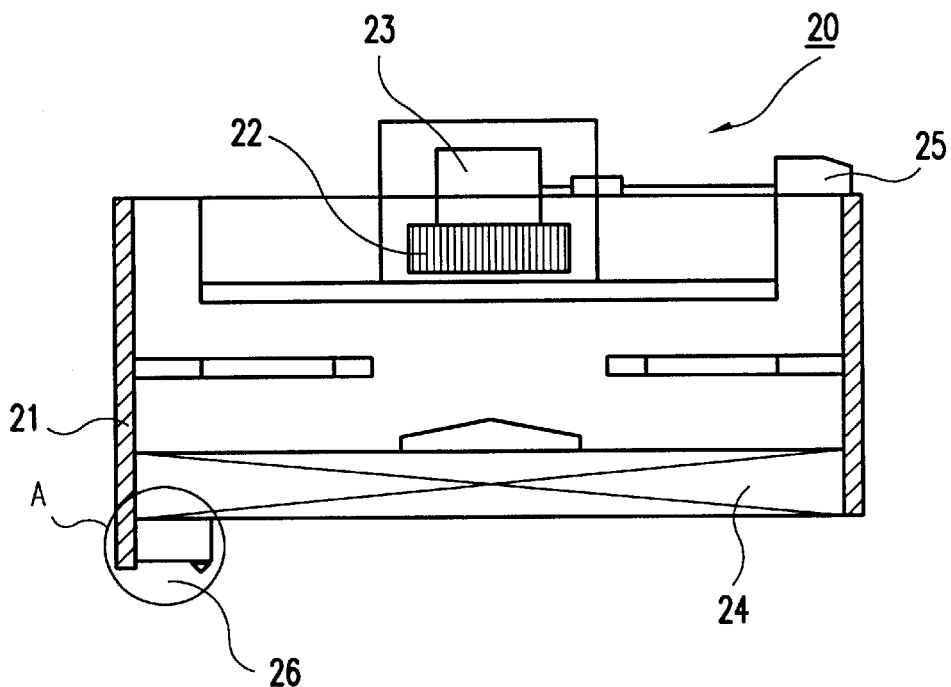
FIG. 4 is a cross-sectional view of the fan filter unit equipped with a monitoring device according to the present invention.

FIG. 4 is a sectional view of the fan filter unit according to the present invention. The fan filter unit comprises a fan 22 and a driving motor 23 installed inside a housing 21. A filter 24 is installed in the lower side of the housing 21 to remove the impurities mixed with the recirculated air from the clean room that is fed through the fan 22.

The driving motor 23 of each fan filter unit is individually controlled by its own local control unit 25 equipped with a micro processor. Below the filter 24 a monitoring device 26 of the fan filter unit according to the present invention is installed.

Figure 5:
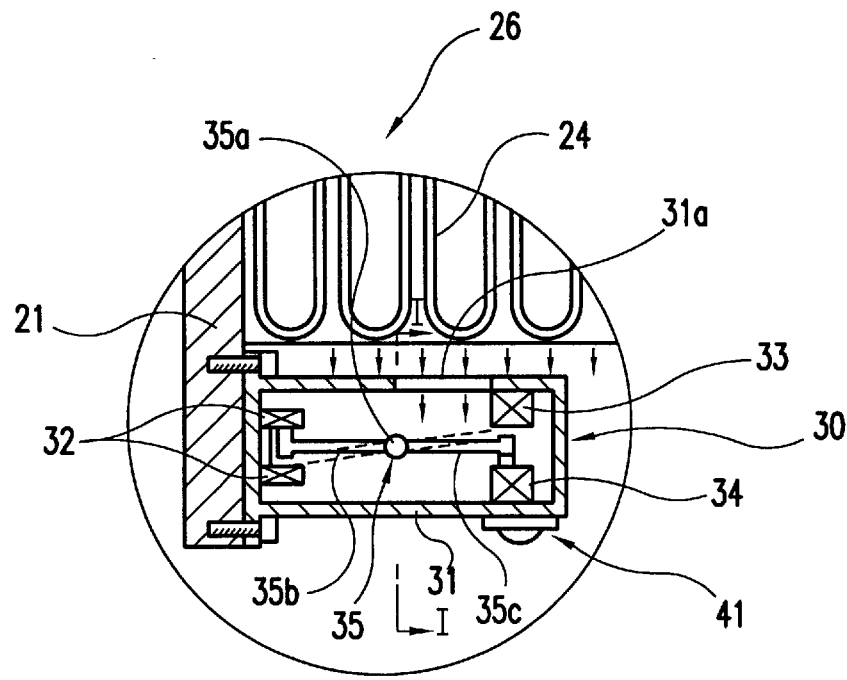
FIG. 5 is an enlarged sectional view showing the portion A of FIG. 4.
Figure 6:
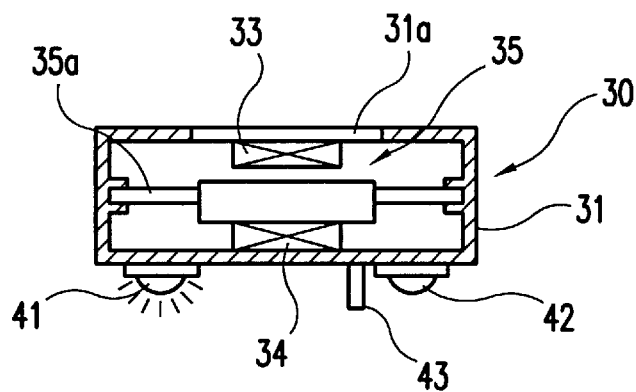
FIG. 6 is a cross-sectional view taken along line 6 of FIG. 5.

With reference to FIG. 5 and FIG. 6, the monitoring device 26, fixed to one lower edge of the housing 21, generally comprises a switching section 30 that operates in response to the force of an air stream introduced into the switching section. The switching section 30 alternately applies power to one of two terminals 33, 34 that are electrically connected to a display section comprising lights 41 and 42. The lights 41, 42 are thus turned on/off according to which of the terminals 33, 34 is connected.

More specifically, the switching section 30 comprises a case 31 having an air inlet 31a on its upper side for introducing an air stream caused by the rotation of the fan 22. On one side of the case 31a power terminal 32 is installed, and at the opposite side of the case 31, a first light connection terminal 33 and a second light connection terminal 34 are provided.

A pivoting body 35 is centrally installed in the case 31 such that one side or wing 35b of the pivoting body contacts the power terminal 32 and the other side or wing 35c may contact either of the first light connection terminal 33 or the second light connection terminal 34. In the embodiment illustrated, the pivoting body 35 is a conductive plate, although other shapes are contemplated within the scope of the present invention. The pivoting body 35 pivots freely about a longitudinal axis via pivot pin 35a, which is attached at each end to opposing inner walls of the case 31 as shown in FIG. 6. The pivot pin 35 may comprise a single body extending all the way through the pivoting body 35, or it may be composed of two pieces, with each piece being attached to a respective side of the pivoting body 35 and the inner wall of the case 30.

In operation, the pivoting body 35 pivots freely in response to the force of the air introduced into the case 31 through air inlet 31a. In normal operations, the fan 22 produces an air stream which flows downwardly to the monitoring device 26. Note that the air inlet 31a is positioned off-center, such that the air introduced into the case 31 contacts the wing 35c of the pivoting body 35c, which is positioned below the air inlet 31a. When air is introduced into the case 31 through air inlet 31a, pivoting body 35 pivots clockwise, that is, the wing 35c under the air inlet 31a moves downward and the wing 35b moves upward. Accordingly, the edge of the wing 35b contacts the power terminal 32 and the edge of the wing 35c thus contacts the terminal 34. Terminal 34 may be electrically connected to either of the lights 41 or 42, but in the illustrated embodiment the terminal 34 is connected to light 41 to activate the light 41. Light 41 is preferably a green light to indicate that the fan unit 20 is operating normally. Of course, different color lights, such as a blue light, may be used. Also, the light 41 is preferably positioned on the bottom of the monitoring device 26 for easy confirmation by an operator.

When the air flow stops, due to a fan unit 20 malfunction, for example, caused by defects with the driving motor 23, no air is introduced into the air inlet 31a. The pivoting body 35 thus pivots counter-clockwise, that is, the wing 35c under the air inlet 31a moves upward and the wing 35b moves downward. This counter-clockwise rotation is achieved by making wing 35b heavier than wing 35c, so that wing 35b moves downwards when the air flow is cut off. Accordingly, the edge of the wing 35b contacts the power terminal 32 and the edge of the wing 35c contacts the terminal 33.

As above, terminal 33 may be electrically connected to either of the lights 41 or 42, but in the illustrated embodiment the terminal 33 is connected to light 42 to activate the light 42. Light 42 is preferably a red light to indicate that the fan unit 20 is operating normally. Of course, different color lights may be used. Also, an audible alarm 43 may be connected to terminal 33 to provide visual and/or audio warning of a malfunction. The light 42 is preferably positioned on the bottom of the monitoring device 26 for easy confirmation by an operator. In such cases, the malfunction is recognized quickly and proper action can be taken by the operator.

Note that the wing 35b always maintains its contact with the power terminal 32, and wing 35c contacts one of the two terminals 33, 34 depending on the pivot state of the pivoting body 35.

Figure 7:
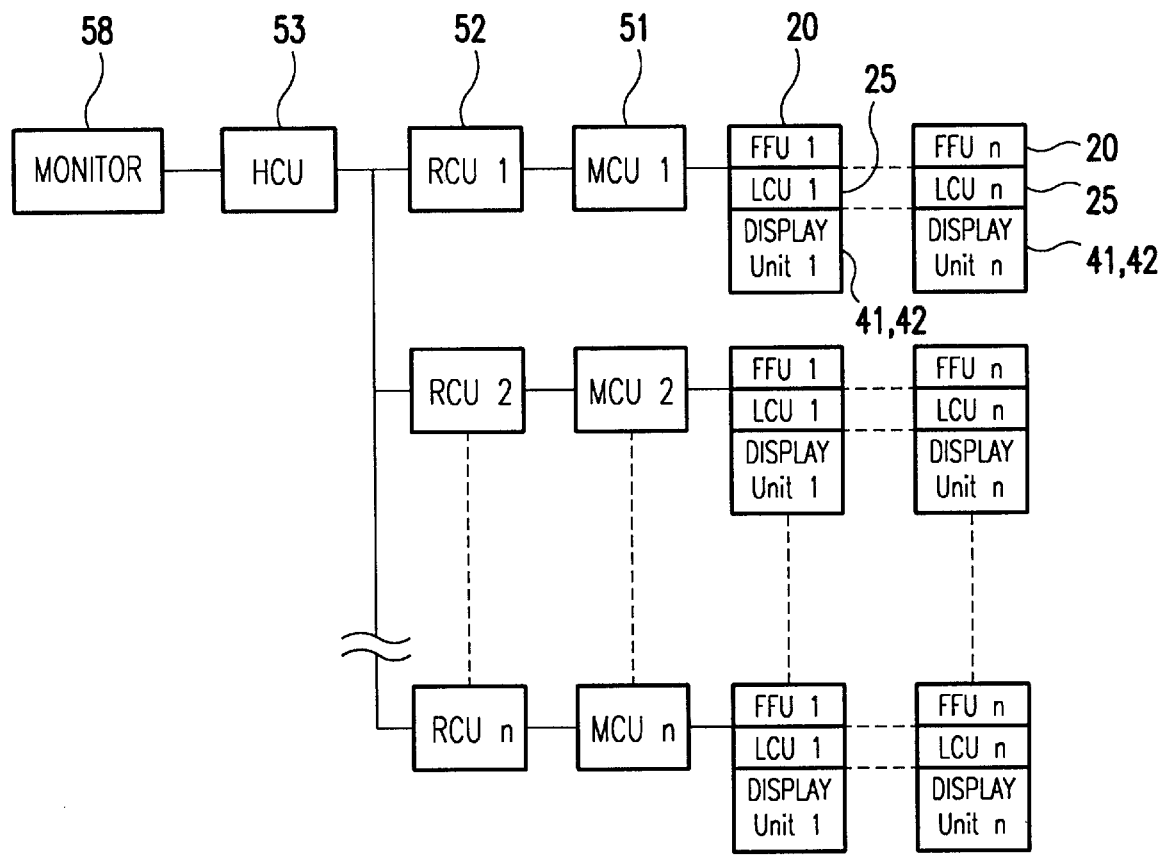
FIG. 7 is a block diagram of the fan filter unit showing the driving control system of the fan filter unit according to the present invention.

FIG. 7 is a block diagram illustrating the driving control system for the fan filter unit of the present invention, where a plurality of fan filter units (FFU) 20 installed in the ceiling of the clean room are divided into groups depending on their locations or installation lines, and a corresponding plurality of multi-control units (MCU) 51 controls each respective group of FFU's. The multi-control units 51 are integrated into a single host control units (HCU) 53 through a plurality of relay control unit (RCU) 52 corresponding to each group of FFUs.

The multi-control unit 51 controls the fan filter unit 20, the local control unit (LCU) 25 driving the driving motor 23 of the fan filter unit 20, and the display section 41, 42 monitoring the rotation of the fan 22. The host control unit 53 centrally monitors the operating state of all of the fan filter units 20 via this network.

With the driving control system and monitoring device for the fan filter unit according to the present invention, the operating state of all the fan filter units in the clean room is precisely and centrally monitored in accordance with the rotation state of the fan to enable an operator to rapidly respond to an abnormal state.

It will be apparent to those skilled in the art that various modifications and variations can be made in the present invention without departing from the spirit or scope of the invention. Thus, it is intended that the present invention cover the modifications and variations of this invention that come within the scope of the appended claims and their equivalents.

What is claimed is:

1. A fan filter unit having a fan, a driving motor, a filter, and a monitoring device comprising:

a switching section positioned relative to said fan so as to be responsive to a force from an air stream introduced therein via rotation of said fan, said switching section including at least one terminal, and a switch body movable by said force from a first position to a second position, said switch body being in operative electrical contact with a respective said terminal when in one of said positions thereof, and out of operative electrical contact with said respective terminal when in the other position thereof, and said switch body providing a path for electric current to said respective terminal when in operative electric contact therewith; and a display section including an electrically operated display connected to said at least one terminal, said display providing a signal, indicative of an operating state of said fan, when supplied with electrical power via said switch body.

2. The fan filter unit of claim 1, wherein said switching section further includes a case defining an air inlet for introducing said air stream into said case, and a power terminal disposed at a first side of said case;

said opposite to said first side, said plurality of terminals comprising
      at least one terminal includes a first display connection terminal disposed on an upper inner surface of said case at a second side of said case, opposite to said first side, and
      a second display connection terminal disposed on a lower inner surface of said case at said second side of said case;
   said display section comprises first and second electrically operated displays connected to said connection terminals, respectively, said displays providing different signals from one another when electrical power is supplied thereto; and
   said switch body is a pivoting body interposed between said power supply terminal and said connection terminals, said pivoting body pivotally mounted in said case so as to pivot about a pivot axis in response to said force exerted by said air stream introduced into said case, said pivoting body connecting said power terminal and said first display connection terminal when in said first position thereof, and said pivoting body connecting said power terminal and said second display connection terminal when in said second position thereof.

3. The (monitoring device) fan filter unit as claimed in claim 2, wherein said switching section further includes a pivot pin attached at each end to third and fourth sides of said case, said pivot pin having a longitudinal axis constituting said pivot axis.

4. The (monitoring device) fan filter unit as claimed in claim 3, wherein said pivoting body is a flat conductive plate having a first wing and a second wing disposed on opposite sides of said pivot axis, respectively, with said second wing being positioned below said air inlet.

5. The fan filter unit as claimed in claim 4, wherein a weight of said first wing is greater than a weight of said second wing.

6. The fan filter unit as claimed in claim 5, wherein an edge of said first wing operatively electrically contacts said power terminal when in said first and second positions thereof, and an edge of said second wing operatively electrically contacts said connection terminals, respectively, when in said first and second positions thereof.

7. The fan filter unit as claimed in claim 6, wherein said pivoting body is supported by said pivot pin so as to pivot around said pivot axis in a clockwise direction, to said second position thereof, in response to said force exerted by said air stream on said second wing positioned below said air inlet, and wherein said edge of said second wing contacts said second connection terminal when said pivoting body is in said second position thereof.

8. The fan filter unit as claimed in claim 7, wherein said second display comprises a light communicating with said second connection terminal to provide a visual signal indicative of normal fan unit operations.

9. The fan filter unit as claimed in claim 6, wherein said pivoting body is supported by said pivot pin so as to pivot around said pivot axis in a counter-clockwise direction, to said first position thereof, when said air stream is cut off due to said greater weight of said first wing, and wherein said edge of said second wing contacts said first connection terminal when said pivoting body is in said first position thereof.

10. The fan filter unit as claimed in claim 8, wherein said first display comprises a light communicating with said first connection terminal to provide a visual signal indicative of abnormal fan unit operations.

11. The fan filter unit as claimed in claim 10, wherein said display section further comprises an audible alarm communicating with said first connection terminal to provide an aural signal indicative of abnormal fan unit operations.

12. A driving control system for a fan filter unit in semiconductor clean room having a plurality of fan filter units on its ceiling, said plurality of fan filter units being divided into groups of fan filter units, said driving control system comprising:

a switching section in each fan filter unit, each said switching section being positioned relative to the fan of the fan filter unit so as to be responsive to a force from an air stream introduced therein via rotation of the fan, said switching section including at least one terminal, and a switch body movable by said force from a first position to a second position, said switch body being in operative electrical contact with a respective said terminal when in one of said positions thereof, and out of operative electrical contact with said respective terminal when in the other position thereof, and said switch body providing a path for electric current to said respective terminal when in operative electric contact therewith;

a display section in each fan filter unit, each said display section including an electrically operated display connected to said at least one terminal, said display providing a signal, indicative of an operating state of said fan, when supplied with electrical power via said switch body;

a respective group multi-control unit operatively associated with each of the groups of fan filter units, each said group multi-control unit monitoring each display section in each fan filter unit of the group of fan filter units;

a respective group relay control unit monitoring each said group multi-control unit; and a host control unit centrally monitoring the group relay control units in a manner which monitors the operating state of each fan of said fan control units.

13. The driving control system of claim 12, wherein each said switching section further includes a case defining an air inlet for introducing said air stream into said case, and a power terminal disposed at a first side of said case;

said at least one terminal includes a first display connection terminal disposed on an upper inner surface of said case, and a second display connection terminal disposed on a lower inner surface of said case at a second side of said case, opposite to said first side;

said display section comprises first and second electrically operated displays connected to said connection terminals, respectively, said displays providing different signals from one another when electrical power is supplied thereto; and said switch body is a pivoting body interposed between said power supply terminal and said connection terminals, said pivoting body pivotally mounted in said case so as to pivot about a pivot axis in response to said force exerted by said air stream introduced into said case, said pivoting body connecting said power terminal and said first display connection terminal when in said first position thereof, and said pivoting body connecting said power terminal and said second display connection terminal when in said second position thereof.

14. The driving control system as claimed in claim 13, wherein one side of said pivoting body is positioned below said air inlet, said pivoting body is supported in said case so as to pivot around said pivot axis in a clockwise direction in response to said force exerted by said air stream on said side of said pivoting body positioned below said air inlet, and an edge of said side of said pivoting body contacts said second display connection terminal when said pivoting body is in said second position thereof.

15. The driving control system as claimed in claim 13, wherein a weight of one side of said pivoting body is greater than a weight of another side of said pivoting body, said pivoting body is supported in said case so as to pivot around said pivot axis in a counter-clockwise direction when said air stream is cut off, due to said greater weight of said one side of said pivoting body, and an edge of said another side of said pivoting body contacts said first display connection terminal when said pivoting body is in said first position thereof.

16. The driving control system as claimed in claim 13, wherein said second display comprises a light communicating with said second connection terminal to provide a visual signal indicative of normal fan unit operations.

17. The driving control system as claimed in claim 13, wherein said first display comprises a light communicating with said first connection terminal to provide a visual signal indicative of abnormal fan unit operations.

18. A monitoring device for use with a motor-driven fan, said monitoring device comprising:

a case defining an air inlet through which an air stream can be introduced into the case from outside the case;

at least one display connection terminal disposed inside said case at one side thereof;

a power terminal disposed inside said case at another side thereof opposite said one side;

a pivoting body supported in said case so as to be pivotable about a pivot axis between first and second positions, said pivoting body being interposed between said power terminal and said at least one display connection terminal, said pivoting body having first and second wings on opposite sides of said pivot axis, respectively, one of said wings of said pivoting body being in electrical contact with a respective said display connection terminal when the pivoting body is in one of said positions thereof, and out of electrical contact with said respective display connection terminal when the pivoting body is in the other position thereof, the other of said wings of said pivoting body being in electrical contact with said power terminal when the pivoting body is in said one of the positions thereof, and said air inlet confronting only one of the first and second wings of said pivoting body, whereby the pivoting body will be pivoted about the pivot axis thereof by a force of an air stream introduced into the casing through said air inlet; and a respective electrically operated display connected to each said at least one display connection terminal, said display providing a signal when supplied with electrical power via said pivoting body.

19. A monitoring device for use with a motor-driven fan as claimed in claim 18, wherein said at least one display connection terminal comprises first and second display connection terminals disposed across from one another at said one side of said case, the electrically operated display connected to said first display connection terminal provides a signal different from that provided by the electrically operated display connected to said second display connection terminal, said pivoting body connects said power terminal and said first display connection terminal when in said first position thereof, and said pivoting body connects said power terminal and said second display connection terminal when in said second position thereof.

20. A monitoring device for use with a motor-driven fan as claimed in claim 18, wherein the weight of the wing of said pivoting body confronted by said air inlet is less than the weight of the other wing of the pivoting body, whereby said pivoting body is weight-biased to one of the positions thereof.

* * * * *